United States Patent [19]

Nemoto et al.

[11] Patent Number: 5,050,030
[45] Date of Patent: Sep. 17, 1991

[54] DISK CASSETTE WITH SHUTTER ATTACHING FEATURE

[75] Inventors: Tsuneo Nemoto, Miyagi; Masayuki Harada, Kanagawa; Kouji Funawatari, Miyagi, all of Japan

[73] Assignee: Sony Corporation, Tokyo, Japan

[21] Appl. No.: 682,865

[22] Filed: Apr. 5, 1991

Related U.S. Application Data

[63] Continuation of Ser. No. 116,478, Nov. 3, 1987, abandoned.

[30] Foreign Application Priority Data

Nov. 6, 1986 [JP] Japan .................................. 61-264367
Nov. 20, 1986 [JP] Japan ........................... 61-178832[U]

[51] Int. Cl.$^5$ ............................................. G11B 23/03
[52] U.S. Cl. ..................................................... 360/133
[58] Field of Search ......................................... 360/133

[56] References Cited

U.S. PATENT DOCUMENTS 4,445,155 4/1984 Takahashi et al. .
4,626,949 12/1986 Brock ................................... 360/133

FOREIGN PATENT DOCUMENTS 2161642 1/1986 United Kingdom .

Primary Examiner—A. J. Heinz
Attorney, Agent, or Firm—Philip M. Shaw, Jr.

[57] ABSTRACT

A disk cassette arrangement which includes a double sided disk is arranged to be used in both dual and single head disk drive units. The cassette case is comprised of upper and lower halves or shells which are formed so that a reinforcing rib is defined when they are coupled together. A guide slot is formed in the rib. The cassette features a shutter which has a U-shaped cross-section and which is slidably disposed on the leading edge of the cassette case. A projection which extends from the inboard edge of the shutter has a barbed like arrangement which can be inserted through a tapered section of the guide slot.

7 Claims, 3 Drawing Sheets

DISK CASSETTE WITH SHUTTER ATTACHING FEATURE

This is a continuation of co-pending application Ser. No. 07/116,478 filed on Nov. 3, 1987, now abandoned.

BACKGROUND OF THE INVENTION

1. Field of the Invention

The present invention relates generally to a disk cassette which rotatably houses a disk-form information recording medium in a cassette casing defining an opening or aperture to allow access of the recording medium by an information recording and/reproducing device in a disk drive apparatus, and which has a sliding shutter operably closing the aforementioned recording medium access aperture. More specifically, the invention relates to an improvement for a sliding shutter arrangement which is suitable for readily fitting onto the cassette casing of a disk cassette, such as a magnetic disk cassette, and for facilitating dust-proofing cover for the recording medium access aperture.

2. Description of the Background Art

Disk cassettes such as those used to house rotatable magnetic disks in a cassette casing, are provided with one or more disk access openings through the cassette casing. However, due to the sensitive nature of the disk surfaces it is desireable to automatically cover the access opening when the disk is not in use. An example of a disk cassette which provided with such means can be found in U.S. Pat. No. 4,445,155. This document is assigned to the common assignee to the present invention. This type of arrangement is widely marketed in the form of a 3.5 inch disk cassette for use in computers and the like type of devices. The disk housed in this type of the cassette casing has at least one surface which is conditioned to record data and which is adapted to be driven by known types of disk drive apparatus. The cassette casing is provided with at least one disk access aperture or opening through which a magnetic recording and/or reproducing head can be inserted in a manner to closely juxtapose the recording surface of the disk. A sliding shutter is mounted on the cassette casing for selectively opening and closing the access aperture. This shutter is adapted to close the opening when the disk is not in use and to be slidable to a position in which an offset opening formed therein coincides the access aperture when the disk is inserted into a disk drive.

This arrangement has basically proven satisfactory however, hithertofore proposed shutters have been formed so as to have an essentially U-shaped cross-section wherein a long narrow edge which defines the bottom of the U-shape and two flat plate-like portions which depend from the narrow edge define the legs of the U-shape.

In order to operatively connect this arrangement to the case of the cassette, a groove has been formed in the external surface of one of the halves of the cassette and one leg of the shutter formed with a pair of projections which are slidably received in the groove. When assembled, the other leg of the shutter slides on the flat face of the other side of the other half or shell of the casing. When assembling this arrangement it is necessary to spread the legs of the U-shaped arrangement when fitting the same onto the case. This tends to bend the member some instances resulting in excessive play, improper sliding characteristics or the like.

In addition to this the guide groove is relatively shallow, the projections received therein accordingly narrow and the U-shaped legs of the shutter relatively flexible, whereby it is relatively easy for the shutter to be spread open to the degree that it can accidentally detach from the case.

SUMMARY OF THE INVENTION

It is a first object of the present invention to provide a shutter and disk cassette casing arrangement which ensures that the shutter can be readily fitted onto the casing simply by pressing it into position.

It is a second object of the present invention to provide a disk cassette arrangement wherein a head access opening is formed in one of the upper and lower halves of the casing and which enables a head assembly of a single head type disk drive to be inserted through either of the same.

It is a third object of the present invention to provide a disk cassette arrangement wherein both of the upper and lower halves of the casing are formed with access openings or apertures and which has only a single shutter to control both.

It is a fourth object of the present invention to provide a disk cassette arrangement wherein the shutter is not easily removed from the casing once fitted thereto.

It is a fifth object of the present invention to provide a disk cassette arrangement wherein the shutter can be easily installed on the casing.

It is sixth object of the present invention to provide a disk cassette arrangement which features a simple construction, few parts and easy assembly.

It is a seventh object of the present invention to provide a disk cassette having a shutter arrangement which has increased lateral width by preventing the shutter from bending and which thus avoids excessive play of the shutter relative to the casing and permits the head access openings to be smoothly openable with proper sliding action by pushing the shutter in said lateral direction.

It is an eighth object of the present invention to provide a disk cassette arrangement having a shutter construction which is resistant to deformation by external forces.

It is a ninth object of the present invention to provide a disk cassette arrangement wherein the case is formed of two halves and wherein each of the halves are formed with recesses which cooperate to define a guide slot within the case, and the shutter has a projection which extends from the narrow edge portion between the legs of the U-shaped arrangement, the projection having a portion which is receivable in the guide slot.

In brief, the above objects are achieved by an arrangement wherein a disk cassette arrangement having a cassette casing which can include a disk-form recording medium, such as a magnetic disk. The cassette casing is formed into a thin, essentially rectangular or square box-shaped configuration having upper and lower planar wall sections extending substantially in parallel to the surfaces of the disk-form recording medium, and front, rear and side walls sections extending between the upper and lower sections in substantially perpendicular to the surfaces of the recording medium. The cassette casing is comprised of upper and lower halves or shells which are formed to have an essentially rectangular or square planar section constituting the upper and lower planar wall sections and circumferentially extending ribs constituting the front, rear and side wall sections when the upper and lower halves are assembled with each other. A guide slot is formed in the front wall section of the cassette casing. The disk cassette arrangement features a shutter which has an essentially U-shaped cross-section and which is slidably disposed on the front or leading edge of the cassette casing. A projection which extends from the inboard edge of the shutter has a barbed like arrangement which can be inserted through a tapered section of the guide slot.

More specifically a first aspect of the present invention takes the form of a disk cassette which features: a rotatable disk; a case in which said disk is rotatably supported, said case having a first surface in which a first head access opening is formed and a second surface which interconnects with said first surface, said second surface having a guide slot formed therein; and a shutter, said shutter being formed with a projection which is received in said guide slot.

A second aspect of the present invention comes in the form of a disk cassette which features: a rotatable disk; a case in which said disk is rotatably supported, said case having first and second interconnecting surfaces, said first surface including a an access opening through which a head can be inserted; a shutter, said shutter having first and second plate sections, said first and second plate sections being disposed adjacent said first and second surfaces respectively, said shutter further having a reinforced projection which extends from said second plate section in the same direction as said first section.

A third aspect of the invention is defined as a disk cassette which features: a rotatable disk; a case in which a disk access opening through which a head may inserted, is formed, said disk access opening being formed in a first surface of a first plate member of said case, said case further including a second plate member having a second surface which interconnects with said first surface; a shutter which is operatively connected to said case by a projection which is received in a guide slot formed in said second surface, said projection extending from a surface of the shutter which corresponds to said second surface.

A further aspect of the invention comes in the form of a disk cassette which features: a rotatable disk; a case in which a disk access opening is formed, said disc access opening permitting a head of a disk drive to be inserted therethrough in a manner to juxtapose a surface of said rotatable disc, said access opening being formed in a first surface of said case, said case further including a second surface which interconnects with said first surface; a shutter for selectively opening and closing said access opening, said shutter including first and second plate sections, said first plate member being arranged to juxtapose said first surface and said second plate section being arranged to juxtapose said second surface, said shutter including a reinforced projection which extends in the same direction as said first plate section.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DETAILED DESCRIPTION OF THE PREFERRED EMBODIMENTS

Figure 1:
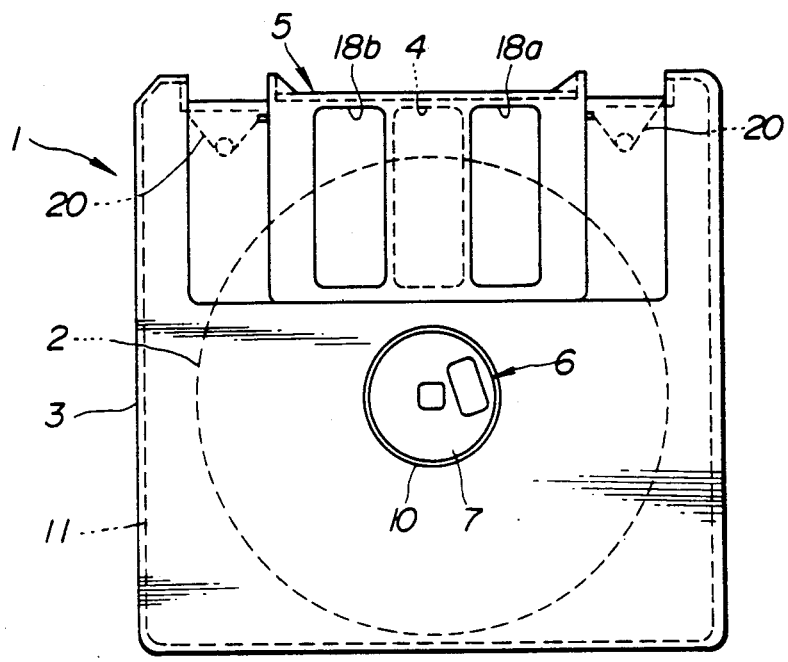
FIG. 1 is a bottom view of a disk cassette case provided with the shutter arrangement according to a preferred embodiment of the present invention.
Figure 2:
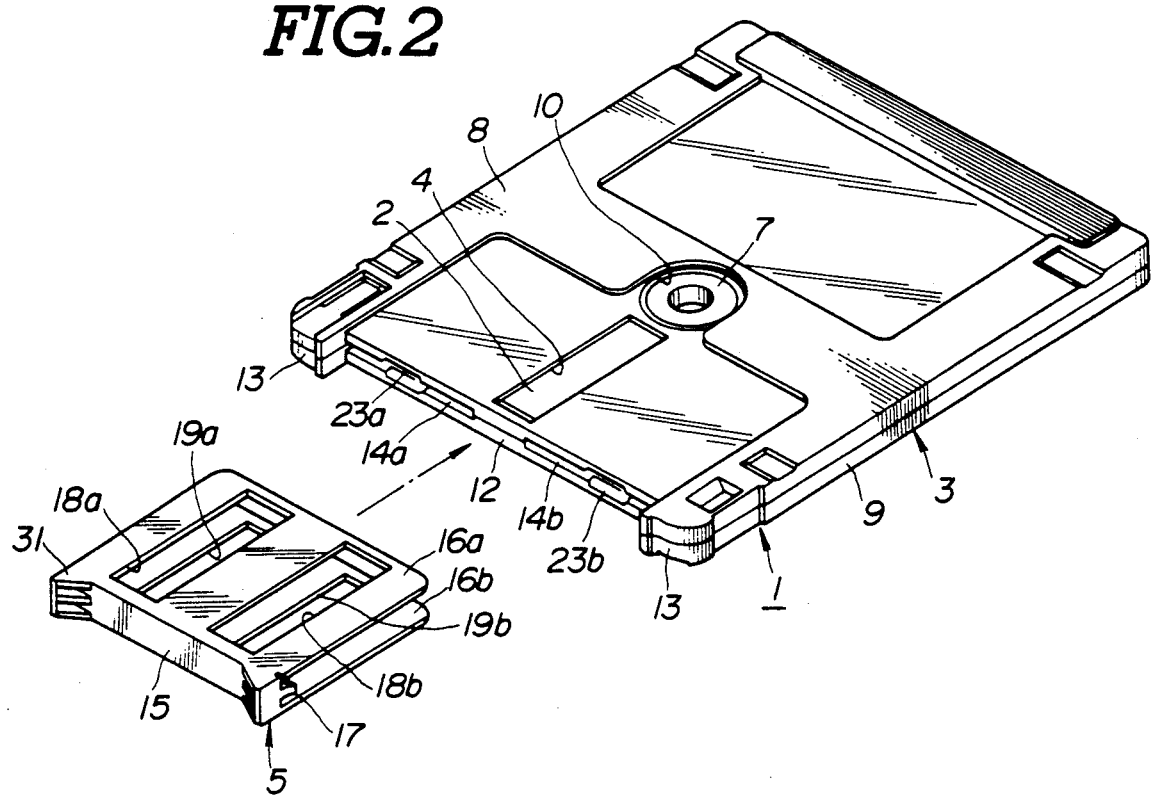
FIG. 2 is an exploded perspective view of the arrangement shown in FIG. 1.

Referring now to the drawings, particularly to FIGS. 1 and 2, the preferred embodiment of a disk cassette arrangement, according to the present invention, is illustrated with a shutter arrangement for openably closing a disk access aperture. The disk cassette 1 comprises a magnetic disc 2 as an information recording medium, a cassette casing 3 in which the disk is rotatably disposed and a shutter 5 which will be described in more detail hereinlater. The disk 2 in this instance takes the form of a thin and flexible circular member of flexible high polymer polyethylene terephthalate which has at least one surface coated with a layer of magnetizable material (or the like) in which data can be recorded. A concentric opening 6 formed in the middle of the circular member. A center hub 7 is fixedly disposed in this opening 6 in a manner to be synchronously rotatable with the circular member or disk as it will be referred to hereinafter.

The casing 3 has an essentially flat square or rectangular shaped configuration and, as shown in FIG. 2, is comparatively thin relative to its length and width dimensions. Since the shown embodiment is directed to house a double-side disk which has both surfaces coated with a magnetizable material, head assembly access apertures 4 are formed in both of the upper and lower halves or shells 8, 9 of the casing 3 which in this instance are formed of a high polymer ABS plastic resin. Felts (not shown) for preventing abrasion and the formation of static electrical charges are disposed between each of the halves and the surfaces of the disk in a well known manner.

Though the shown embodiment employs the double-side disk as the recording medium and, as a consequence, the head access apertures 4 are formed in both of upper and lower halves 8 and 9, the invention should not be appreciated to be concentrated to such double-side disk cassette. Namely, the present invention is also applicable for a single-side disk cassette which has a single-sided magnetic disk. In the latter case, the head access aperture may be formed in only one of the upper and lower halves opposing the surface coated by the magnetizable material. Furthermore, it should be appreciated, though the materials of the magnetic disk and the cassette casing are specified hereabove, it should be appreciated that the foregoing recitations about the materials should be mere example and non-essential feature to the present invention.

Circular openings 10 are formed in essentially the middle of the upper and lower halves 8, 9 of the case 3. These openings are concentric the hub 7 and permit a drive connection between the latter and the turntable of a drive mechanism of the disk drive (both not shown) to be established upon insertion of the disk.

As seen in FIG. 1 the inwardly depending ribs of respective of upper and lower halves 8 and 9 define the front, rear and side wall sections 11 of the assembled cassette casing 3. The upper and lower halves 8, 9 of the casing 3 are also formed with ribs 21, 22 which extend substantially in parallel to the ribs 11 forming the front wall section of the assembled cassette casing 3. As clearly seen from FIG. 3, the ribs 21 and 22 are so arranged as to overlap with each other and thus serve for mutual positioning of the upper and lower halves in assembling. The ribs 21, 22 may also serve to form reinforment for the cassette casing in order to prevent the casing from deforming.

The front or leading wall 12 of the cassette is slightly recessed in a manner to define two shoulder portions 13 which project forward from the forward front corners of the arrangement. As best seen in FIG. 2 the front wall section 12 is formed with two guide slots 14a and 14b.

The shutter 5 has an essentially U-shaped cross-section which defines a narrow edge portion 15 and two integral flat plate-like portions 16a and 16b which depend from the edge portion 15 to define the legs of the U-shape. First and second projections 17 are formed on the inboard surface of the edge portion 15 proximate the ends thereof. In this embodiment in order to reduce sliding friction, the shutter 5 is formed of a polyoxymethylene high polymer which exhibits excellant abrasion resistance.

The flat plate-like portions 16a and 16b of the shutter 5 are formed with apertures 18a, 18b and 19a, 19b, respectively. These apertures 18a, 18b and 19a, 19b are arranged to be larger than the disk access apertures 4 formed in the upper and lower halves 8 and 9 of the casing 3, and are located so that when the shutter 5 is moved from a home position in one direction by a predetermined amount for moving the apertures 18a and 19a to locations wherein the head of the disk drive can be moved into close proximity of the disk and; when moved by essentially the same amount in the opposite direction from its home or neutral position, the apertures 18b and 19b expose the disk access apertures 4.

It will be noted that it is possible to increase the number of apertures formed in the shutter and that the present invention is not limited to the use of only 4.

Figure 3:
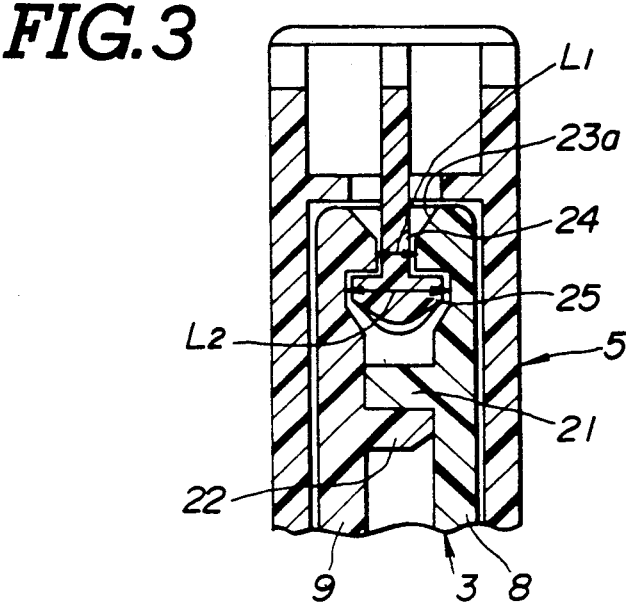
FIG. 3 is a sectional view showing the shutter mounted on the disk cassette and the construction which characterizes the embodiment of the present invention.

As apparent from FIG. 3 the upper and lower halves or shells of the casing 3 are so configured that the guide slots 14a, 14b formed in the front wall section 12 of the casing are in such configuration as to each have a wide section having a width L2 and a narrow throat-like section having a width L1. Further, as best seen in FIG. 2 the central sections of the guide slots 14a, 14b are also formed with outwardly opening tapers 23a and 23b. It should be noted however, that the location of the tapers is not necessarily limited to the illustrated positions and can be formed in other positions if so desired.

Figure 4:
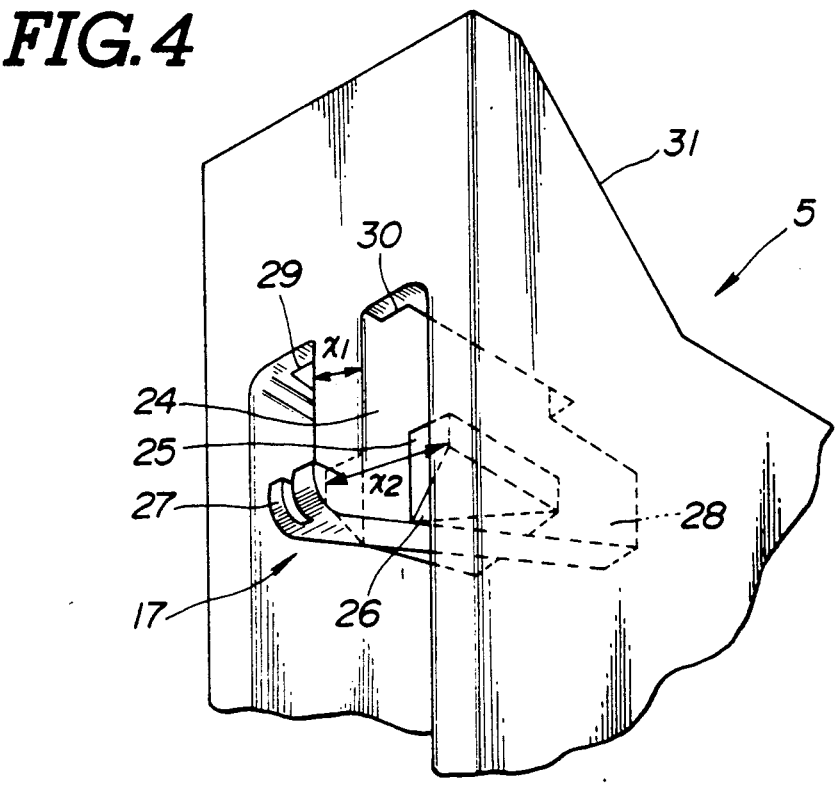
FIG. 4 is a perspective view of a corner of the shutter as seen from a first angle.

The projections 17 are, as shown in FIGS. 3 and 4, formed with a narrow section 24 having a width x1 and a wide section 25 having a width x2. As will be appreciated from FIG. 3 these widths are selected to be just less than the corresponding widths L1 and L2. With this construction when the shutter 5 is fitted onto the casing, the barb-like or arrow head-like constructions 25 on the ends of the projections 17 prevent the shutter from being readily removed therefrom.

Tapered portions 26 are formed on each of the wide portions 25 in a manner which defines a nose-like arrangement. These nose portions cooperate with the tapers 23a and 23b formed in the guide slots 14a and 14b in a manner which facilitates the distortion of the upper and lower halves or shells 8 and 9 as the projections 17 are forced through the guide slots to assume the positions shown in FIG. 3. Therefore, upon assemblying the shutter 5 onto the front wall section 12 of the cassette casing 3, the projections 17 of the shutter can easily engage with the guide slots 14a, 14b placing the wide section 25 within the wide section of the guide slots by simply pressing the shutter toward the front wall section to cause aforementioned distortional action of the upper and lower halves for convenient and efficient assembling operation.

Figure 5:
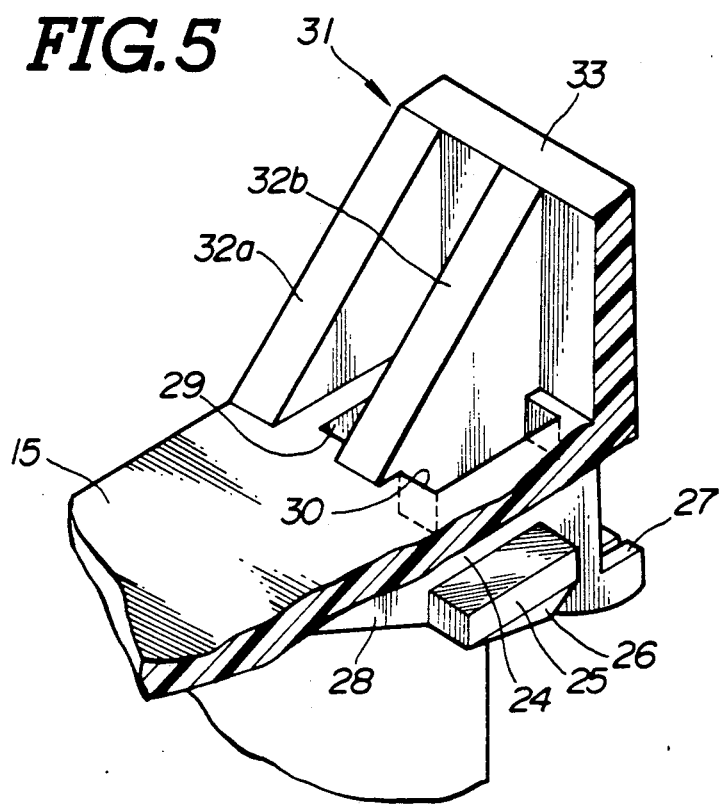
FIG. 5 is a second perspective view of a corner of the disk cassette as viewed from a second angle.
Figure 6:
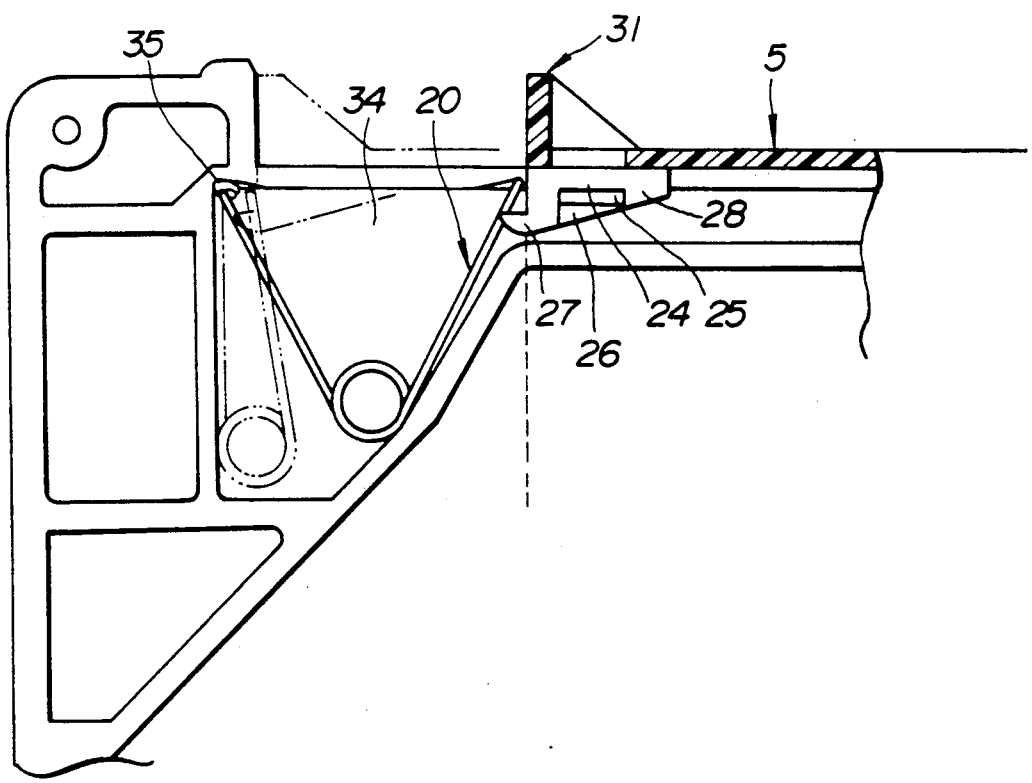
FIG. 6 is a cut-away and partially sectioned view of disk cassette and shutter in an assembled state and which highlights the sliding motion of the shutter and the attendant compression of a torsion spring which cooperates with the construction which characterizes the embodiment of the instant invention.

In order to reinforce the projections 17 against distortion and possible breakage both during assembly and use, webs or ribs 28 are formed integrally with the same and are arranged to extend inwardly along the inner surface of the edge portion 15 as shown in FIGS. 4, 5 and 6. A fork-like arrangement 27 is formed on laterally outboard edges of the narrow section 24 of each of the projections 17. These arrangements serve to engage the inboard legs of the torsion springs 20 which are disposed in the case 3 on either side of the shutter 5 and which bias the same to assume the above mentioned normal or home position wherein the disk access apertures 4 are closed. The outboard leg of each of the torsion springs 20 are arranged to seat in a corner section 35.

The shutter further includes apertures 29 and 30. These apertures are provided at each end of the edge portion 15 (see FIG. 5) are provided to facilitate the injection moulding of the unit. Formed on the upper surface and at both ends of the edge portion 15 adjacent injection moulding facilitation apertures 29 and 30 are triangular shaped shoulder-like projections 31. These projections 31 are comprised of two parallel triangular shaped webs or ribs 32a and 32b and an end wall 33 which is arranged normally to the just mentioned ribs.

These constructions increase the rigidity of the shutter 5 and assist in preventing any distortion of the projections 17 during assembly and sliding motion against the spring force of one of the springs 20. The projections also assist for preventing the edge portion 15 of the shutter 5 from bending and cause it to maintain firm and dust-proofing contact between the flat plate-like portions 16a and 16b and the associated surfaces of the upper and lower halves 8, 9 of the cassette casing. They further assist in providing surfaces which cooperate with a pin (not shown) of the disk drive which engages the shutter and moves to one side in a manner which opens the disk access opening 4. The end walls 33 are arranged to abut against the inwardly depending walls (no numeral) of the shoulder 13 defined on the case 3.

Although the preceeding description has related to disks which are coated with a magentizable medium it will be understood that other types of disks which are influenced by light (lasers) or ones having an abrasive surface for head cleaning purposes may also be used without departing in any way from the scope of the present invention which is delimited only the appended claims.

What is claimed is:

1. A disk cassette comprising:
a rotatable disk;
a case in which said disk is rotatably supported, said cash having a first surface in which a first head access opening is formed, a second surface which interconnects with said first surface, said second surface having a guide slot formed therein, the guide slot having a tapered portion, and a third surface disposed opposite said first surface, wherein one or both or said first and third surfaces is formed with a head access opening; and
a shutter, said shutter being formed with first, second and third plate sections, said first, second and third plate sections being arranged to define a U-shaped cross-section, said first and third plate sections of said shutter being disposed against said first and third surfaces, respectively, and wherein said shutter further includes a reinforced, barbed projection extending from said second plate section between said first and third plate sections and which is received in the tapered portion of said guide slot.

2. A disk cassette as claimed in claim 1 wherein said projection has a first section which extends through said guide slot and an end section located radially inwardly from said guide slot, said first section having a width which is less than that of said slot and said end section having a width greater than that of said guide slot.

3. A disk cassette as claimed in claim 2 wherein said end section includes a tapered surface.

4. A disk cassette as claimed in claim 1 wherein said cassette comprises an upper shell and a lower shell, said upper and lower shells including means which defines a rib which extends about the periphery of the case, said guide slot being defined by a cut-out formed in said rib.

5. A disk cassette as claimed in claim 1 wherein said guide slot is formed with ends and a central tapered section, said tapered section widening toward the guide slot ends.

6. A disk cassette as claimed in claim 1 wherein said guide slot is formed with ends and a central tapered section, said tapered section widening toward the guide slot ends.

7. A disk cassette comprising:
a rotatable disk;
a case in which said disk is rotatably supported, said case having first surface in which a first head access opening is formed, a second surface which interconnects with said first surface, said second surface having a guide slot formed therein, the guide slot having a tapered portion, and a third surface disposed opposite said first surface, wherein one or both or said first and third surfaces is formed with a head access opening;
a shutter, said shutter being formed with first, second and third plate sections, said first, second and third plate sections being arranged to define a U-shaped cross-section, said first and third plate sections of said shutter being disposed against said first and third surfaces, respectively, and wherein said shutter further includes a reinforced, barbed like projection extending from said second plate section between said first and third plate sections and which is received in the tapered portion of said guide slot; and
a pair of torsion springs mounted in the case at each end of the guide slot, each torsion spring having an outboard leg which is attached to the case and an inboard leg for engaging the shutter projection and wherein said projection further includes edges facing the ends of the guide slot, each edge having a fork-like arrangement for receiving the inboard legs of the torsion springs.

* * * * *